US012518638B2

(12) United States Patent
Da Conceicao et al.

(10) Patent No.: US 12,518,638 B2
(45) Date of Patent: Jan. 6, 2026

(54) METHOD FOR VERIFYING AT LEAST ONE FLIGHT PLAN, AND ASSOCIATED COMPUTER PROGRAM PRODUCT AND MODULE FOR VERIFYING AT LEAST ONE FLIGHT PLAN

(71) Applicant: THALES, Courbevoie (FR)

(72) Inventors: Marc Da Conceicao, Toulouse (FR); Marc Riedinger, Toulouse (FR); Willy Tocquec, Toulouse (FR)

(73) Assignee: THALES, Courbevoie (FR)

( * ) Notice: Subject to any disclaimer, the term of this patent is extended or adjusted under 35 U.S.C. 154(b) by 92 days.

(21) Appl. No.: 17/789,084

(22) PCT Filed: Dec. 23, 2020

(86) PCT No.: PCT/EP2020/087786
§ 371 (c)(1),
(2) Date: Jun. 24, 2022

(87) PCT Pub. No.: WO2021/130325
PCT Pub. Date: Jul. 1, 2021

(65) Prior Publication Data
US 2023/0023800 A1 Jan. 26, 2023

(30) Foreign Application Priority Data
Dec. 27, 2019 (FR) ..................................... 19 15649

(51) Int. Cl.
*G08G 5/34* (2025.01)
*G08G 5/21* (2025.01)

(52) U.S. Cl.
CPC ................ *G08G 5/34* (2025.01); *G08G 5/21* (2025.01)

(58) Field of Classification Search
CPC .................................................... G08G 5/0039
See application file for complete search history.

(56) References Cited

U.S. PATENT DOCUMENTS

2010/0030401 A1* 2/2010 Rogers ................ G08G 5/0039 701/3
2010/0250026 A1* 9/2010 Deker .................... G01C 23/00 715/810

FOREIGN PATENT DOCUMENTS

EP 1322916 A2 7/2003

OTHER PUBLICATIONS

French Search Report, from the French Patent Office in counterpart French Application No. 1915649, dated Oct. 6, 2020.
(Continued)

*Primary Examiner* — Travis R Hunnings
(74) *Attorney, Agent, or Firm* — ArentFox Schiff LLP

(57) ABSTRACT

The present invention relates to a method of assisting in the checking of at least one flight plan among at least a first flight plan and a second flight plan, each flight plan being associated with an ordered list of elements. The method comprises the steps of comparing flight plans in order to identify among the elements associated with said plans, common elements for all the plans and distinctive elements for each flight plan, and to display, a first comparative zone comprising a tree structure defining a plurality of levels, each level comprising a single root formed from one of the common elements or a branch for each flight plan, at least one of the branches in a same level comprising at least one of the distinctive elements associated with the corresponding flight plan.

13 Claims, 6 Drawing Sheets

(56) References Cited

OTHER PUBLICATIONS

International Search Report and Written Opinion, issued by International Searching Authority in corresponding International Application No. PCT/EP2020/087786, mailed on Mar. 15, 2021. (with Partial Translation).

* cited by examiner

METHOD FOR VERIFYING AT LEAST ONE FLIGHT PLAN, AND ASSOCIATED COMPUTER PROGRAM PRODUCT AND MODULE FOR VERIFYING AT LEAST ONE FLIGHT PLAN

CROSS-REFERENCE TO RELATED APPLICATIONS

This application is a National Stage Entry of International Patent Application No. PCT/EP2020/087786, filed on Dec. 23, 2020, which claims priority to French Application No. 1915649, filed on Dec. 27, 2019. The disclosures of the priority applications are incorporated in their entirety herein by reference.

The present invention relates to a method for verifying at least one flight plan.

The present invention further relates to a computer program product and a module for verifying at least one associated flight plan.

The field of the invention is that of the management of the flight of an aircraft.

Aircraft, as known per se, comprise navigation management systems such as e.g. the Flight Management System (FMS), used for defining a flight plan and for calculating a trajectory and predictions associated with said trajectory.

The flight plan is generally defined by a pilot before the flight.

However, in some cases, said flight plan may be subject to modifications during e.g., the flight of the aircraft.

In such cases, specialized applications of the FMS system allow a third-party system to submit a new flight plan to be followed by the aircraft.

Such a third-party system may be another on-board avionics system or a tablet which can be used by the pilot in the cockpit, as well as a system external to the aircraft such as a ground service or another aircraft.

Under the current state of the aeronautical procedure, the pilot has the obligation to perform a complete analysis of a flight plan proposed to him from a third system during the flight and to decide whether or not to accept the flight plan.

The methods known from the prior-art propose an "all or nothing" approach insofar as a proposed flight plan is either fully accepted or fully rejected by the pilot.

Currently, the pilot is responsible for a manual check of the conformity and consistency of the proposed flight plan.

Most of the time, such control is tedious. Indeed, there is generally no technique allowing the pilot to make sure that a received flight plan is acceptable, nor to understand the nature of the modifications compared to the flight plan originally planned thereof.

The purpose of the present invention is to simplify the tasks of the pilot when receiving a new flight plan, in particular, from a third-party system.

To this end, the subject matter of the present invention is a method for verifying at least one flight plan among at least one first flight plan and one second flight plan, each flight plan being associated with an ordered list of elements.

The method comprises the following steps:

- comparing the flight plans in order to identify among the elements associated with said plans, common elements for all the plans and distinctive elements for each flight plan;
- displaying a first comparative zone comprising a tree structure which defines a plurality of levels, each level comprising one root formed by one of the common elements or a branch for each flight plan, at least one of the branches amongst the branches of a same level comprising at least one of the distinctive elements associated with the corresponding flight plan.

According to other advantageous aspects of the invention, the assistance method comprises one or more of the following characteristics, taken individually or according to all technically possible combinations:

- the tree structure extends according to a main direction, each branch being parallel with the main direction; advantageously, the main direction is a vertical direction;
- each sequence of roots and branches extending in the main direction wherein the branches corresponding to the same flight plan are ordered according to the order determined by the ordered list of elements associated with said flight plan;
- at least one branch comprises all the distinctive elements arranged in the ordered list associated with the corresponding flight plan between the two common elements corresponding to the roots adjacent to said branch or when only one root is adjacent to said branch, between the common element corresponding to said root and the start or end of the ordered list, said branch then being of the complete type; and
- at least one branch comprises only certain of the distinctive elements arranged in the ordered list of the corresponding flight plan between the two common elements corresponding to the roots adjacent to said branch or when only one root is adjacent to said branch, between the common element corresponding to said root and the start or end of the ordered list, said branch then being of the retracted type; and
- acquiring a command from a user to modify a type of one of the displayed branches;
- displaying said branch according with said type.
- each flight plan is further associated with descriptive data for each element associated with said flight plan;
- the step of comparing flight plans further comprises, for each common element, a comparison of the descriptive data associated with said common element and when said data are different, a marking of said common element.
- the step displaying the first comparative zone further comprises a display of at least one symbol next to each root corresponding to one of the marked common elements;
- acquiring a command from a user to display the descriptive data of at least one of the marked common elements according to at least one of the flight plans;
- displaying said descriptive data;
- acquiring overall predictions for each flight plan;
- displaying a second comparative zone comprising a sub-zone for each flight plan, each sub-zone comprising the overall predictions for the corresponding flight plan;
- the sub-zones of the second comparative zone are arranged one after the other according to the main direction;
- each flight plan further comprises initialization and performance data, the initialization and performance data comprising a plurality of categories;
- the method further comprising a step of displaying a third comparative zone a category sub-zone and a data sub-zone for each flight plan;
- the category sub-zone comprising at least some of the categories of initialization and performance data;
- each data sub-zone comprising initialization and performance data relating to the corresponding flight plan for each category of the category sub-zone, arranged opposite the corresponding category.

category-by-category comparison of the initialization and performance data for different flight plans;

displaying an alert in the third comparative zone in the event of detecting at least one deviation exceeding a predetermined threshold between initialization and performance data of the same category and relating to different flight plans;

acquiring weather data relating to each flight plan, the weather data comprising a plurality of categories, each category relating to a flight phase of the aircraft or to an altitude;

displaying a fourth comparative zone comprising a category sub-zone and a data sub-zone for each flight plan;

the category sub-zone comprising at least some of the categories of weather data;

each data sub-zone comprising weather data for each category of the category sub-zone, arranged opposite the corresponding category.

The further subject matter of the invention relates to a computer program product including software instructions which, when implemented by computer hardware, implements the method as previously defined.

The further subject matter of the invention is a checking assistance module of at least one flight plan among at least one first flight plan and one second flight plan comprising technical resources configured for implementing the method as previously defined.

The characteristics and advantages of the invention will appear upon reading the following description, given only as a limiting example, and making reference to the enclosed drawings, wherein.

Figure 1:
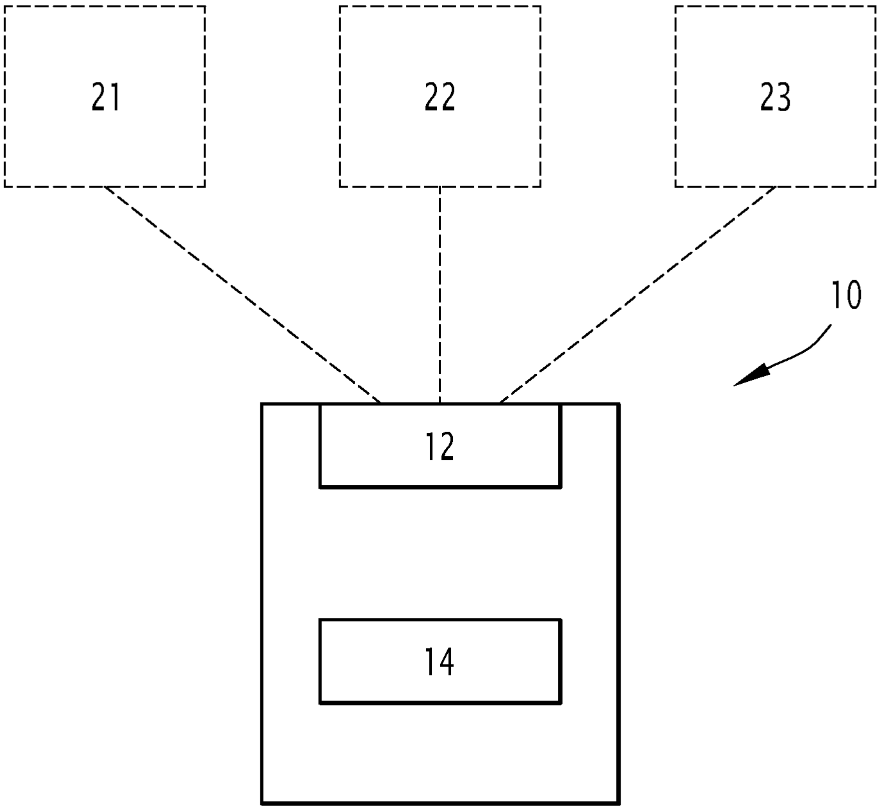
FIG. 1 is a schematic view of a checking assistance module according to the invention.

Indeed, FIG. 1 shows a checking assistance module 10 for at least one flight plan of an aircraft.

"Aircraft" refers to any flying machine which can be remotely piloted from a cockpit thereof, such as of an airplane, or which can also be remotely piloted by a pilot who is then at a distance from the flying machine, such as a drone.

A "flight plan" refers to an ordered list of elements and descriptive data corresponding to said elements, allowing at least part of the aircraft trajectory to be defined.

Such elements and descriptive data will be subsequently referred to as interior elements and interior descriptive data respectively, in order to underline the belonging thereof to the corresponding flight plan.

The flight plan is formed e.g. according to the ARINC 424 standard.

Thus, in accordance with this standard, each interior element of the flight plan comprises a physical point of passage of the aircraft called "waypoint" or a trajectory element called "leg".

Moreover, as is known per se, each interior element is associated with interior descriptive data which have constraints such as a speed constraint, an altitude constraint, a desired time of passage, etc.

Such interior descriptive data therefore correspond to each element of the flight plan and represent data which vary depending on the nature of that element.

Advantageously according to the invention, at least some of the interior elements of a flight plan are further associated with one or more external elements, i.e. elements which are not comprised in the flight plan.

Such external elements are e.g. defined or determined or calculated from the interior elements of the flight plan.

Thus e.g. each external element associated with an interior element of a flight plan is chosen from the group comprising:

a procedure which can be used when flying over the corresponding interior element;

a geometrical element (curvature, extent, shape, etc.) of the geometry of the trajectory when flying over the corresponding interior element;

external descriptive data (such as e.g. constraints) other than interior descriptive data associated with the corresponding interior element.

Thereafter, unless explicitly stated, the term "element" shall be used interchangeably to designate an interior element of a flight plan or an external element associated with an interior element of such a plan.

Similarly, unless otherwise specified, the term "descriptive data" will be used interchangeably to refer to interior descriptive data of a flight plan or to external descriptive data of such a plan.

The checking assistance module 10 according to the invention is shown in more detail in FIG. 1.

Thus, as can be seen in FIG. 1, the checking assistance module 10 comprises a data receiver/transmitter 12 and a processing unit 14.

The data receiver/transmitter 12 is used for receiving data from external systems to be processed by the processing unit 14 and for transmitting processed data to said external systems or to other external systems.

In the example shown in FIG. 1, such external systems comprise e.g. a tablet 21, a flight management system 22 of the FMS type, and a display interface 23.

Tablet 21 is e.g. a so-called open-world tablet of the aircraft, since the data transmitted from said tablet are not protected according to the same aeronautical standards as the checking aid module 10.

For example, the link between the receiver/transmitter 12 and this tablet 21 is a protected link to the avionics world, providing protection to filter data from the tablet 21 into the avionics world.

In particular, the tablet 21 is configured for sending to the data receiver/transmitter 12, a flight plan proposed to the pilot, e.g. during the flight of the aircraft.

The FMS type system 22 and the interface 23 are part of the avionics world insofar as the data exchanged with said systems have avionics data which are protected according to the same aeronautical standards as the checking aid module 10 or according to standards providing a higher security level.

In particular, the FMS system 22 is apt to supply a flight plane to the data receiver/transmitter 12, e.g. the current flight plan of the aircraft or any other flight plan, e.g. a flight plan being prepared by the pilot.

The FMS system 22 is further apt to supply the receiver/transmitter 12 with initialization and performance data associated with the flight plan which was sent.

The FMS system 22 is further apt to supply the receiver/transmitter 12 with external elements and external descriptive data associated with the flight plan which was sent.

The FMS system 22 is further apt to supply the receiver/transmitter 12 with overall predictions, initialization and performance data, and weather data associated with the flight plan which was sent.

"Overall predictions" about a flight plan refer to essential flight characteristics predicted from said flight plan, such as the ground or air distance along the trajectory, the travel time, the time of arrival, the fuel consumed, the fuel remaining upon arrival, a calculation of mean wind, setpoint indicators for the flight planning, etc.

"Initialization and performance data" associated with a flight plan refer to characteristic quantities for the flight defined by said flight plan, such as: cruising altitude, take-off speed, altitude references, characteristic weights, aircraft centering, engine consumption/performance criteria, name of the route used, etc.

Each of these characteristic quantities forms a category of initialization and performance data.

"Weather data" for a flight plan refer to weather forecasts, in particular wind speed and direction and temperature, for each flight phase of the aircraft according to said flight plan or for each altitude determined by said flight plan.

Thus, weather data further form categories grouping together data relative to the same flight phases or to the same altitudes.

The Interface 23 has a communicating interface between the pilot and the checking assistance module 10.

The interface 23 has e.g. a touch screen which allows the pilot to enter data for the data receiver/transmitter 12 and to display data coming from the data receiver/transmitter 12

The processing unit 14 is used to process input data from the receiver/transmitter 12 in order to produce output data.

In particular, the input data from the data receiver/transmitter 12 comprise at least two flight plans, one of said flight plans will be called in the following, first flight plan P1 and the other will be called second flight plan P2.

The first flight plan P1 comes e.g. from the FMS system 22 and corresponds to the current flight plan of the aircraft.

The second P2 flight plan comes from the tablet 21 and represents a flight plan proposed by a third party such as the airline company or any other ground service.

In a variant, the second P2 flight plan comes from a "Datalink" type on-board system which is thus also connected to the data receiver/transmitter 12, or comes from the FMS type system 22.

The input data further comprise external elements and external descriptive data associated with each flight plan, as well as overall predictions, initialization and performance data, and weather data associated with each flight plan.

The processing unit 14 is used to compare the two flight plans P1, P2 in order to generate a data structure summarizing all the differences and similarities between said flight plans and to generate commands for the interface 23 in order to display said structure.

To this end, the processing unit 14 is at least partly in the form of a software program or a programmable logic circuit such as an FPGA (Field-Programmable Gate Array).

In order to implement the operation of the processing unit 14, the checking assistance module 10 is integrated into an existing on-board computer of the aircraft or into a remote computer for the aircraft, e.g. a ground computer.

According to a particular embodiment of the invention, the checking assistance module 10 has a software and/or hardware component of the system of the FPGA type 22.

The checking assistance module 10 is in particular apt to implement a method for assisting the checking of at least one flight plan among at least one first flight plan and one second flight plan, according to the invention.

It is also clear that this method can be applied in a similar manner for checking a flight plan among any number of flight plans.

Figure 2:
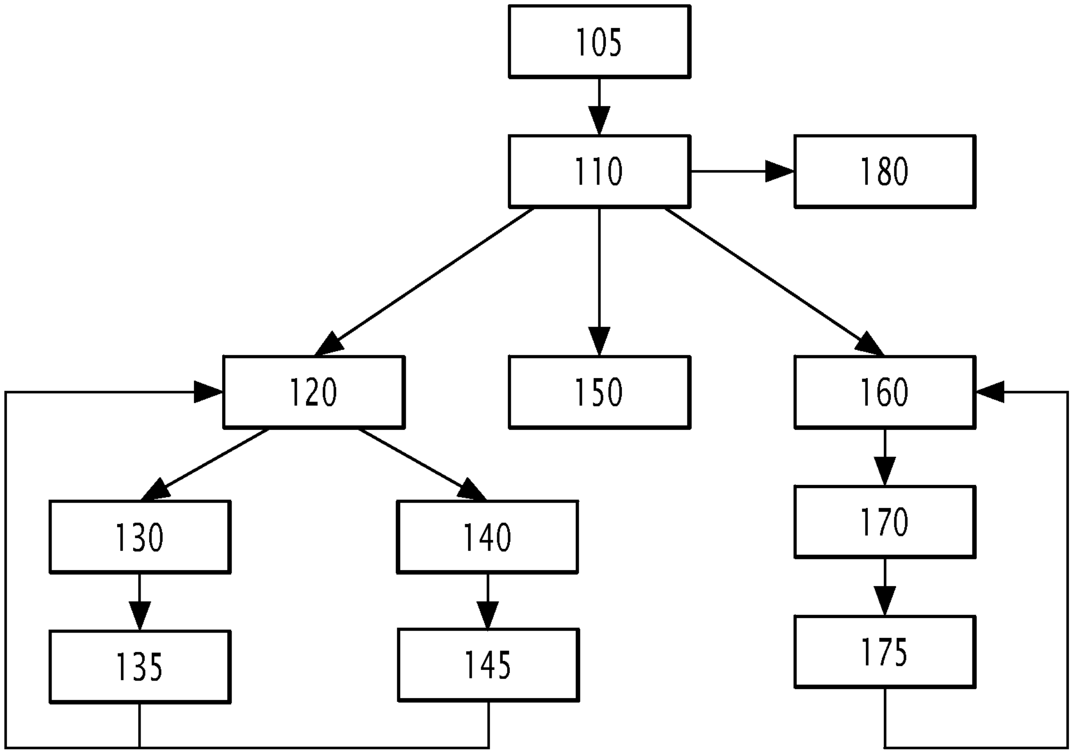
FIG. 2 is a flowchart of a checking assistance method according to the invention, the method being implemented by the checking assistance module in FIG. 1.

The method will now be explained making reference to FIG. 2 which shows a flowchart of the steps thereof.

It is initially considered that the data receiver/transmitter 12 receives two separate flight plans.

Among said flight plans, as explained above, a first flight plan P1 comes from e.g. the FMS system 22 and corresponds to the current flight plan of the aircraft, and a second P2 flight plan comes e.g. from the tablet 21 and corresponds to the flight plan submitted to the pilot for acceptance by the airline.

Moreover, it is considered that the second P2 flight plan was further analyzed by the FMS type system 22 in order to generate, in particular overall predictions, initialization and performance data, and weather data associated with the second P2 flight plan.

The method according to the present invention comprises an initial step 105 where the processing unit 14 acquires all the data from the data receiver/transmitter 12 and in particular the flight plans P1, P2 and possibly the external elements associated with said flight plans, external descriptive data associated with said flight plans and overall predictions, initialization and performance data, and weather data associated with the flight plans.

During the next step 110, the processing unit 14 compares the two flight plans P1, P2 in order to identify, among the elements associated with said plans, common elements for all said plans and distinctive elements for each flight plan.

In particular, during the step 110, the processing unit 14 generates a structure wherein each element common to the two flight plans comprises a "no difference" marker when the descriptive data of said common element is identical for the two flight plans and a "modified" marker when the descriptive data are different.

For each distinctive element associated with the first flight plan P1, said structure comprises e.g. a "deleted" marker.

For each distinctive element associated with the second flight plan P2, said structure comprises e.g. an "added" marker.

Furthermore, the resulting structure is displayed e.g. in a text form or in any other suitable format.

During the step 120, the processing unit 14 generates display commands for the interface 23 in order to display a first comparative zone of the two flight plans P1, P2.

The first zone is used to compare the elements associated with the flight plans and comprises a tree structure for this purpose.

The tree structure defines a plurality of levels, each level comprising a single root formed by one of the common elements or a branch for each flight plan. At least one of the branches amongst the branches of a same level comprises at least one of the distinctive elements associated with the corresponding flight plan.

In other words, each level comprises either a single element which is then a common element of the flight plans or one or more distinctive elements for at least one flight plan. The distinctive elements of a flight plan then form a branch.

Figure 3:
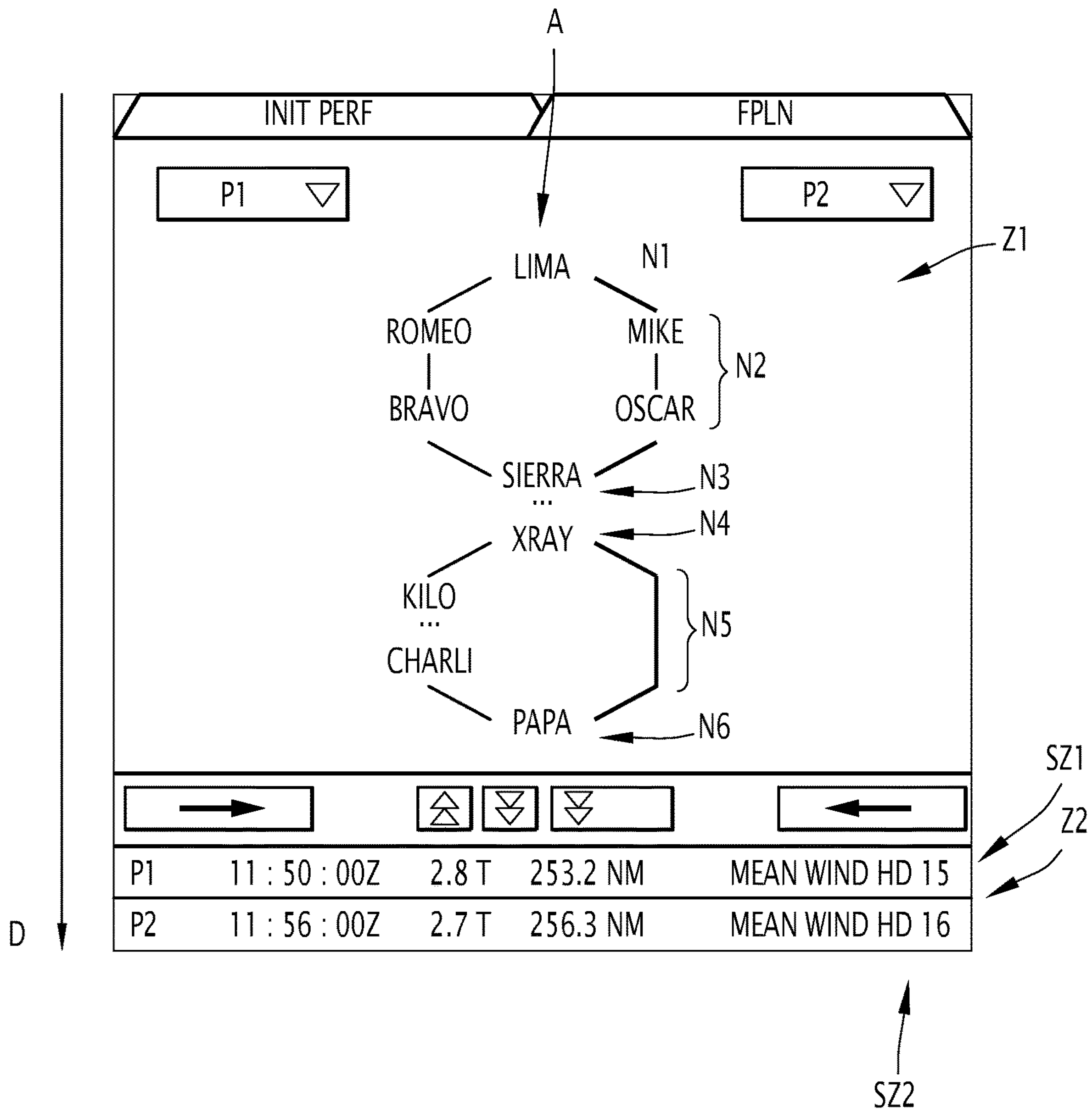
FIGS. 3 to 6 are different views illustrating the implementation of the method shown in FIG. 2, according to an example of input data.

An example of a first zone is shown in FIG. 3 wherein that zone is referenced by the reference Z1 and the corresponding tree structure by the reference A.

Thus, in the example in FIG. 3, the tree structure comprises six levels N1 to N6.

The levels N1, N3, N4, and N6 are formed by single roots having the common elements “LIMA”, “SIERRA”, “XRAY”, and “PAPA” respectively, associated with the two P1, P2 flight plans.

The levels N2 and N5 are formed by two branches, each branch corresponding to one of the P1, P2 flight plans.

Thus, the level N2 branch for the flight plan P1 comprises the elements “ROMEO” and “BRAVO”, and the branch of the same level for the flight plan P2 comprises the elements “MIKE” and “OSCAR”.

The level N5 branch for the flight plan P1 comprises the elements “KILO” and “CHARLIE”, and the branch of the same level for the flight plan P2 is empty.

Advantageously, according to the invention, the tree structure extends according to a main direction, each branch being parallel to the main direction.

In the example shown in FIG. 3, the tree structure A extends along a main direction D corresponding to a vertical direction.

It is thus clear that each sequence of roots and branches extending along the main direction D wherein the branches correspond to the same flight plan, is ordered according to the order determined by the ordered list of elements associated with that flight plan.

In other words, the elements associated with the same flight plan follow one after the other in the main direction D according to the order determined by the corresponding ordered list.

It is then clear for a person skilled in the art that the main direction is a chronological direction of each flight plan.

Moreover, each branch can be of the complete type or of the retracted type.

In particular, a branch being of complete type where same comprises all the distinctive elements arranged in the ordered list associated with the corresponding flight plan between the two common elements corresponding to the roots adjacent to said branch or where a single root is adjacent to said branch, between the common element corresponding to said root and the start or the end of the ordered list.

In other words, a complete-type branch comprises all of the distinctive elements of a flight plan which follow each other.

In the example in FIG. 3, the N2 level branches are of the complete type because the elements “LIMA”, “ROMEO”, “BRAVO” and “SIERRA” as well as the elements “LIMA”, “MIKE”, “OSCAR” and “SIERRA” form continuous sequences in the ordered lists associated with flight plan P1 and flight plan P2, respectively.

A branch is of the retracted type when same includes only some of the distinctive elements arranged in the ordered list of the corresponding flight plan between the two common elements corresponding to the roots adjacent to said branch or when only one root is adjacent to said branch, between the common element corresponding to said root and the start or the end of the ordered list.

In the example in FIG. 3, level N5 branch relative to the first flight plan P1 is of the contracted type because at least one other element is present between the elements “KILO” and “CHARLIE” in the sequence formed by said elements in the ordered list associated with the first flight plan P1. In FIG. 3, this is represented by the symbol “ . . . ” placed along the main direction D between the elements “KILO” and “CHARLIE”.

Similar to the branches, a continuous sequence of roots can be complete or retracted.

In particular, a sequence of roots is of the complete type when same includes all the common elements arranged in the ordered list associated with one of the flight plans between two distinctive elements of said flight plan or between a distinctive element and the beginning or the end of said ordered list.

A sequence of roots is of the retracted type when same includes only certain common elements arranged in the ordered list associated with one of the flight plans between two distinctive elements of said flight plan or between a distinctive element and the beginning or the end of said ordered list.

In the example in FIG. 3, the root sequence formed by the roots “SIERRA” and “XRAY” is of the retracted type. As in the previous, the retracted type is identified by the symbol “ . . . ” between the corresponding common elements.

Initially, when the step 120 was implemented, all branches and all root sequences are e.g. of the complete type.

According to another embodiment, when the step 120 was implemented, all branches and all root sequences were e.g. of the retracted type.

In this case, said branches and said root sequences comprise e.g. only the first and the last elements of the corresponding ordered lists.

Advantageously, the method according to the invention further comprises a step 130 wherein the data transmitter/receiver 12 acquires a command from a user in order to modify a type of at least one of the displayed branches and/or at least one of the root sequences.

Said command can be given e.g. in relation to all the branches and root sequences displayed or in relation to only some of them.

In the first case, to give such a command, the user can actuate a dedicated button e.g. in the first zone Z1.

In the second case, the user can choose the branch or sequence of roots for which a type change is desired.

Thus, in the example in FIG. 3, an action in relation to the symbol “ . . . ” may lead to the extension of the corresponding branch or sequence.

This action is e.g. a cursor click or a touch movement or simply a cursor movement around the symbol “ . . . ”.

After the transmitter/receiver 12 has acquired the command, the processing unit 14 modifies in a suitable way, the type of the corresponding branch or branches and/or the corresponding root sequence or sequences, during the step 135.

In this way, the display of the tree structure in the first zone Z1, is modified.

Advantageously, according to the invention, the common elements having the marker “modified” are displayed differently during the step 120 compared with the common elements having the “no difference” marker. This may e.g. relate to the display color and the display format.

In a variant, a specific symbol, such e.g. the symbol “*”, is displayed next to each common element having the marker “modified”.

Even more advantageously, for each common element having the “modified” marker, the tree structure level corresponding to said common element comprises for each flight plan, the descriptive data corresponding to said common element according to said flight plan.

Figure 4:
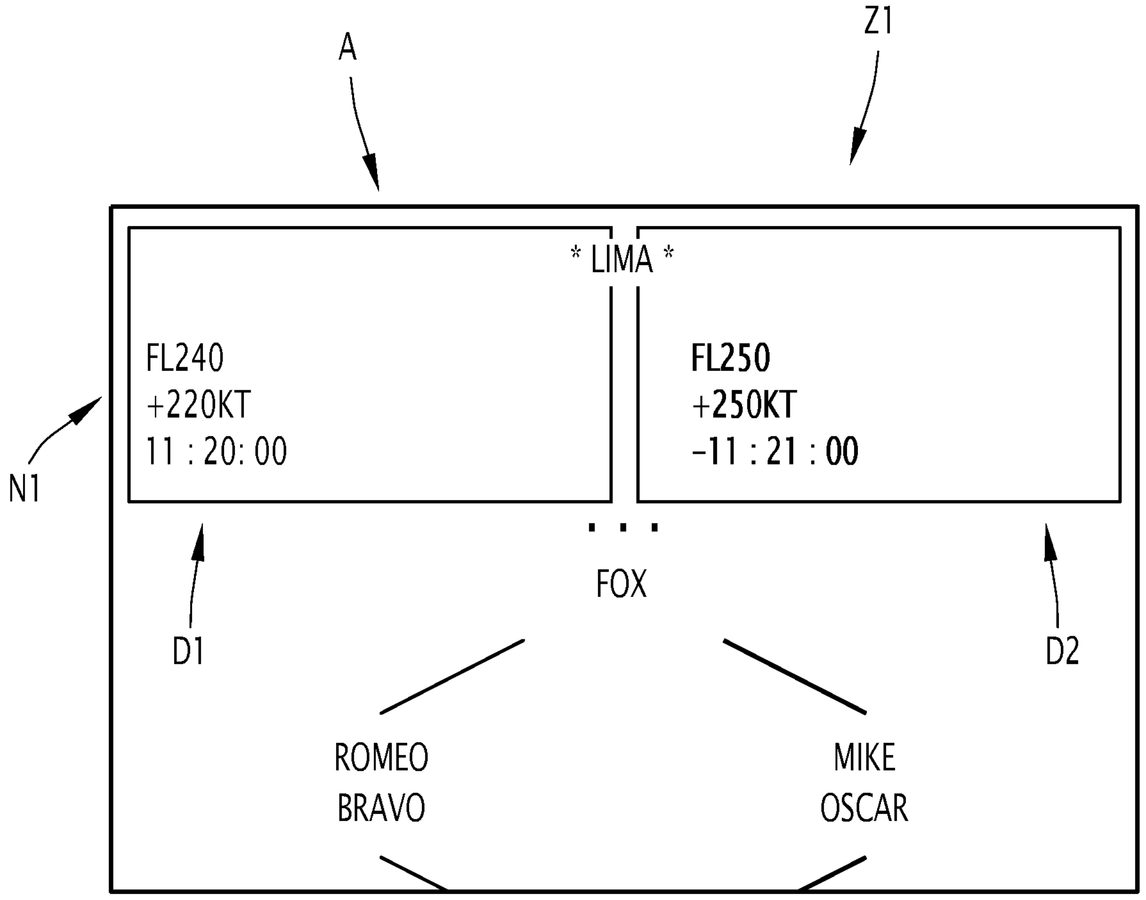

Thus, in the example in FIG. 4, the element “LIMA” corresponds to descriptive data D1 according to the first flight plan P1 and to descriptive data D2 according to the second flight plan P2, said data D1 and D2 being then different.

The data D1 and D2 are therefore displayed in the N1 level corresponding to the element "LIMA".

In a variant, the different descriptive data for the same common element is displayed only after the acquisition of a corresponding command during the step 140. Said command includes, e.g. the actuating of the symbol displayed next to the common element having the marker "modified". In such a case, the processing unit modifies the corresponding display during the step 145.

During the step 150, the processing unit 14 generates display commands for the interface 23 in order to display a second comparative zone comprising a sub-zone for each flight P1, P2, each sub-zone comprising the overall predictions for the corresponding flight plan.

Said sub-zones of the second zone are arranged one after the other along the main direction.

Thus, in the example in FIG. 3, the second comparative zone, referenced in the figure by the reference Z2, is arranged below the first zone Z1 along the main direction D.

This second zone Z2 then comprises a first sub-zone SZ1 relative to the first flight plan P1 and a second sub-zone SZ2 relative to the second flight plan P2.

Furthermore, in the example in FIG. 3, each of the sub-zones SZ1, SZ2 displays the overall predictions for the corresponding flight plan, including the estimated time of arrival, the amount of fuel remaining at arrival, the distance overflown, and the average wind.

The step 150 is e.g. implemented simultaneously with the step 120.

During the step 160, the processing unit 14 generates display commands for the interface 23 in order to display a third comparative zone for comparing initialization and performance data from different flight plans.

The step 160 is e.g. implemented independently of the steps 120 and 150. Thus, the third comparative zone is displayed independently of the first two comparative zones, e.g. in a different tab of the interface 23.

Thus, the step 160 is e.g. implemented after the user activates the corresponding tab.

Figure 5:
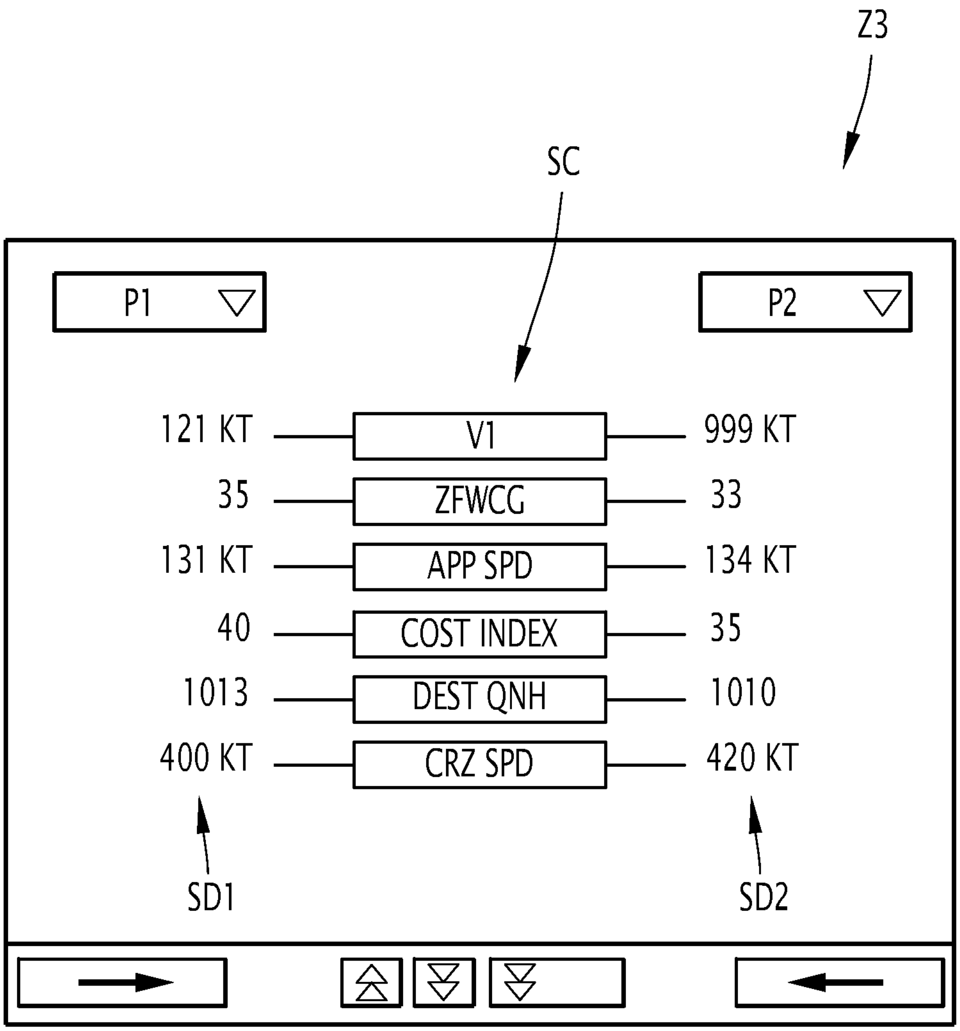

An example of a third comparative zone is shown in FIG. 5, wherein same is identified by the reference Z3.

In particular, as shown in FIG. 5, the third comparative zone Z3 comprises a category sub-zone SC and a data sub-zone SD1, SD2 for each flight plan P1, P2.

The category sub-zone SC comprises indications of at least some of the initialization and performance data categories.

Each data sub-zone SD1, SD2 comprises initialization and performance data for the corresponding flight plan P1, P2 for each category of the category sub-zone.

Said data are then arranged opposite the corresponding category on both sides of the category sub-zone SC. In this example, the category sub-zone SC is then comprised between the data sub-zones SD1, SD2.

Advantageously, according to the invention, the method further comprises the step 170 which is implemented following the step 160 during which the processing unit 14 compares the initialization and performance data of different flight plans, category-by-category.

Thus, when the processing unit 14 detects an inconsistency between said data during the next step 175, same generates a command to display an alert in the third comparative zone Z3.

An inconsistency is detected when e.g. at least one difference between the data in the same category for different flight plans exceeds a predetermined threshold.

During the step 180, the processing unit 14 generates display commands for the interface 23 in order to display a fourth comparative zone for comparing weather data relative to different flight plans.

The step 170 is e.g. implemented independently of steps 120, 150, and 160. Thus, the fourth comparative zone is displayed independently of the first three comparative zones, e.g. in a different tab of the interface 23.

Figure 6:
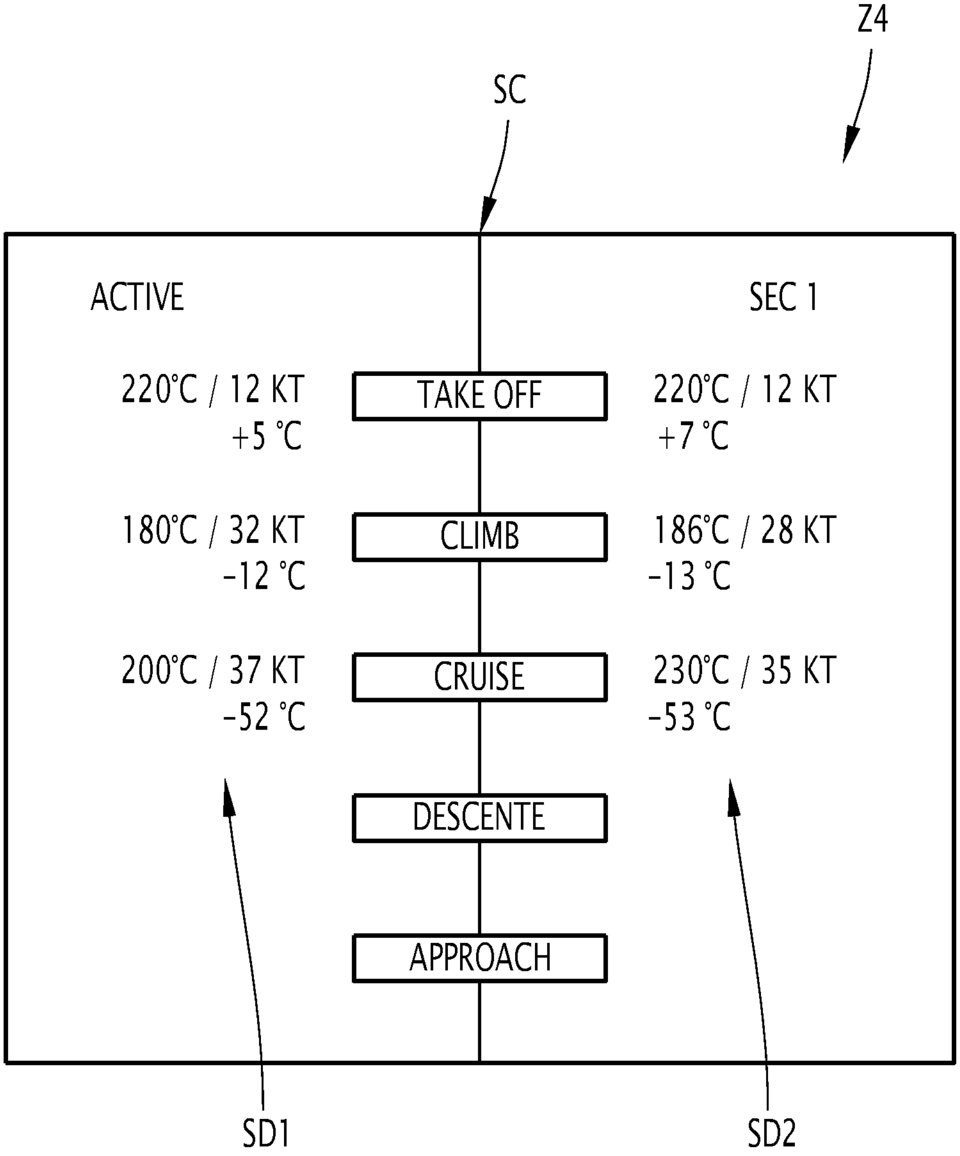

An example of a fourth comparative zone is shown in FIG. 6, wherein it is identified by the reference Z4.

In particular, as shown in FIG. 6, the fourth comparative zone Z4 comprises a category sub-zone SC and a data sub-zone SD1, SD2 for each flight plan.

The SC category sub-zone comprises at least some categories of weather data. As mentioned previously, such categories may relate to the phases of flight, as in the example in FIG. 6, or different altitudes associated with these phases of flight.

Each data sub-zone SD1, SD2 comprises weather data for each category in the category sub-zone SC.

Said data are then arranged opposite the corresponding category on both sides of the category sub-zone SC.

As in the example in FIG. 5, the category sub-zone SC in the example in FIG. 6 is located between the data sub-zones SD1, SD2.

It is then easy to understand that the present invention has a number of advantages.

First of all, the invention provides a synthetic view of the differences between at least two flight plans.

The differences and similarities between flight plans are represented in a tree structure form, which makes it possible compare these flight plans very quickly in order to check e.g. one against the other.

The present invention also makes visible, the differences and similarities not only of the internal elements of the flight plans but also of the external elements of said flight plans as well as other types of data associated with said flight plans such as weather data, initialization and performance data, and predictions.

In this way, the cognitive workload is reduced for the pilot when it is e.g. necessary to check a flight plan from a third party.

The invention claimed is:

1. A method for assisting a checking of at least one flight plan among at least one first flight plan and one second flight plan, each flight plan being associated with an ordered list of elements;

the method comprising steps:

comparing the flight plans in order to identify among the elements associated with said plans, common elements for all said plans and distinctive elements for each flight plan;

displaying a first comparative zone comprising a tree structure defining a plurality of levels, each level comprising a single root formed by one of the common elements or a branch for each flight plan, at least one of the branches amongst the branches of a same level, comprising at least one of the distinctive elements associated with a corresponding flight plan;

wherein the tree structure extends along a main direction, each branch being parallel to the main direction;

wherein each flight plan is further associated with descriptive data for each element associated with said flight plan;

comparison step between the flight plans further comprises for each common element, a comparison of the descriptive data associated with said common element and, when said data are different, a marking of said common element;

the step displaying the first comparative zone further comprises a display of at least one symbol next to each root corresponding to one of the marked common elements.

2. The method according to claim 1, wherein the main direction is a vertical direction.

3. The method according to claim 1, wherein each sequence of roots and branches extending along the main direction wherein the branches correspond to the same flight plan, are ordered according to the order determined by the ordered list of elements associated with said flight plan.

4. The method according to claim 3, wherein:

at least one branch comprises all the distinctive elements arranged in the ordered list associated with the corresponding flight plan between the two common elements corresponding to the roots adjacent to said branch or when only one root is adjacent to said branch, between the common element corresponding to said root and a start or end of the ordered list, said branch then being of a complete type; and at least one branch comprises only certain of the distinctive elements arranged in the ordered list of the corresponding flight plan between the two common elements corresponding to the roots adjacent to said branch or when only one root is adjacent to said branch, between the common element corresponding to said root and the start or the end of the ordered list, said branch then being of a retracted type.

5. The method according to claim 4, further comprising steps:

acquiring a command from a user in order to modify a type of one of the displayed branches;

displaying said branch according to said type.

6. The method according to claim 1, further comprising steps:

acquiring a command from a user to display the descriptive data of at least one of the common elements marked according to at least one of the flight plans;

displaying said descriptive data.

7. The method according to claim 1, further comprising steps:

acquiring overall predictions for each flight plan;

displaying a second comparative zone comprising a sub-zone for each flight plan, each sub-zone comprising the overall predictions for the corresponding flight plan.

8. The method according to claim 7, wherein the sub-zones of the second comparative zone are arranged one after another, along the main direction.

9. The method according to claim 1, wherein each flight plan further comprises initialization and performance data, the initialization and performance data comprising a plurality of categories;

the method further comprising a step of displaying a third comparative zone comprising a category sub-zone and a data sub-zone for each flight plan;

the category sub-zone comprising at least some of the initialization and performance data categories;

each data sub-zone comprising initialization and performance data relating to the corresponding flight plan for each category of the category sub-zone, arranged opposite the corresponding category.

10. The method according to claim 9, further comprising steps:

comparing the initialization and performance data for different flight plans, category-by-category;

displaying an alert in the third comparative zone in a event of detecting at least one difference exceeding a predetermined threshold, between initialization and performance data of a same category and relating to different flight plans.

11. The method according to claim 1, further comprising steps:

acquiring weather data relating to each flight plan, the weather data comprising a plurality of categories, each category being relative to a flight phase of an aircraft or to an altitude;

displaying fourth comparative zone comprising a category sub-zone and a data sub-zone for each flight plan;

the category sub-zone comprising at least some of the categories of weather data;

each data sub-zone comprising weather data for each category of the category sub-zone, arranged opposite a corresponding category.

12. A non-transitory computer-readable storage medium containing executable computer program code, the code comprising instructions configured to cause a computing device to implement the method according to claim 1.

13. A checking assistance module of at least one flight plan among at least a first flight plan and a second flight plan comprising technical resources configured to implement the method according to claim 1.

* * * * *